United States Patent [19]

Williams et al.

[11] 4,414,080
[45] Nov. 8, 1983

[54] PHOTOELECTROCHEMICAL ELECTRODES

[75] Inventors: Roger M. Williams; Alan Rembaum, both of Pasadena, Calif.

[73] Assignee: The United States of America as represented by the Administrator of the National Aeronautics and Space Administration, Washington, D.C.

[21] Appl. No.: 376,306

[22] Filed: May 10, 1982

[51] Int. Cl.³ .......................... C25B 1/02; H01M 6/36
[52] U.S. Cl. ..................................... 204/129; 204/242; 204/278; 204/290 R; 204/DIG. 3; 427/443.2; 429/111
[58] Field of Search ................... 204/129, 242, 290 R, 204/DIG. 3, 278; 429/111; 427/430.1, 443.1, 443.2

[56] References Cited

U.S. PATENT DOCUMENTS 4,379,740 4/1983 Nazzal et al. ...................... 204/129

OTHER PUBLICATIONS

J. A. Bruce et al, *J. Am. Chem. Soc.*, vol. 104, pp. 74–82 (Jan. 1982).
R. N. Dominey et al, *J. Am. Chem. Soc.*, vol. 104, pp. 467–482 (Jan. 1982).
H. D. Abruna et al, *J. Am. Chem. Soc.*, vol. 103, pp. 6901–6904 (Nov. 1981).
D. C. Bookbinder et al, *J. Am. Chem. Soc.*, vol. 102, pp. 5123–5125 (1980).
H. D. Abruna et al, *J. Am. Chem. Soc.*, vol. 103, pp. 1–5 (Jan. 1981).
O. Haas et al, *J. Am. Chem. Soc.*, vol. 103, pp. 1318 ∝ 1319 (1981).
P. K. Ghosh et al, *J. Electrochem. Soc.*, vol. 128, pp. 1281–1287 (Jun. 1981).
D. C. Bookbinder et al, *Proc. Nat'l Acad. Sci USA*, vol. 77, pp. 6280–6284 (1980).

*Primary Examiner*—Aaron Weisstuch
*Attorney, Agent, or Firm*—John R. Manning; Paul F. McCaul; Thomas H. Jones

[57] ABSTRACT

The surface (20) of a moderate band gap semiconductor (12) such as p-type molybdenum sulfide is modified to contain an adherent film (24) of charge mediating ionene polymer containing an electroactive unit such as bipyridinium. Electron transport between the electrode (12) and the mediator film (24) is favorable and photocorrosion and recombination processes are suppressed. Incorporation of particles (26) of catalyst such as platinum within the film (24) provides a reduction in overvoltage. The polymer film is readily deposited on the electrode surface and can be rendered stable by ionic or addition cross-linking. Catalyst can be predispersed in the polymer film or a salt can be impregnated into the film and reduced therein.

23 Claims, 5 Drawing Figures

PHOTOELECTROCHEMICAL ELECTRODES

DESCRIPTION

Origin of the Invention

The invention described herein was made in the performance of work under a NASA contract and is subject to the provisions of Section 305 of the National Aeronautics and Space Act of 1958, Public Law 83-568 (72 Stat. 435; 42 USC 2457).

TECHNICAL FIELD

The present invention relates to photoelectrochemical electrodes and, more particularly to such electrodes coated with a layer of catalyst particles dispersed in an ionic polymer.

Background Art

Self sufficiency in energy is a stated national goal. Most of the proposed means to achieve this goal are either environmentally unacceptable or are not feasible, especially those not depending on fossil fuel sources. Of the available alternatives, solar energy is the most abundant, inexhaustable single resource available. However, capturing and utilizing solar energy is not simple. Methods are being sought to convert solar energy to a concentrated, storable form of energy. A known method, photosynthesis, converts somewhat less than 1% of the sun's energy at the earth's surface to a solid fuel, i.e., plant materials, which when accumulated and transformed over geologic ages yielded fossil fuels. Current rates of use of these fossil fuels, and the particular geographic distribution and political control of major petroleum resources pose problems for nations that are net petroleum consumers. An alternate method yielding a simpler fuel, at a higher conversion, has long been desired.

Photoelectrochemical conversion of visible light to chemical or electrical energy has attracted wide attention, and has the potential of being a relatively efficient process. Photochemical processes can involve the application of liquid-junction transducers to solar energy conversion. These semiconductor-electrolyte junction devices have an advantage over solid state photovoltaics in that (1) they can directly generate hydrogen or carry out other photoredox processes, and (2) they can use polycrystalline semiconductor electrodes. The junction is easily prepared merely by dipping the electrode in the electrolyte, in contrast to solid state junctions which have to be prepared by diffusion or ion implantation. Actual systems are most often of low efficiency or are adversely affected by corrosion of the semiconductor photoelectrode. These two problems arise, at least in part, from one fundamental deficiency. While the electrolyte-semiconductor interface has excellent characteristics for separation of charge and generation of high oxidation or reduction potentials when irradiated, it often has very poor catalytic properties for reactions with significant activation energies.

Since the intensity of solar radiation drops substantially at wavelengths corresponding to higher energies, only semiconductors with band gaps of 2.0 eV or less can be used for highly efficient (20% or greater) solar photoelectrochemical cells. Important reactions such as photoelectrolysis of water or reduction of $CO_2$ require thermodynamic energy inputs of 1.23 and 1.5 eV, respectively. Greater energy input is required to make up for losses due to band bending (necessary in order to separate charge at the semiconductor surface), resistance losses, and overvoltage potentials.

The reaction of greatest interest is photoelectrolysis of water to obtain hydrogen and oxygen.

Initial investigations showed that both the anode reaction:

$$2H_2O \rightarrow O_2 + 4H^+ + 4e^-$$

and the cathode reaction $$2H^+ + 2e^- \rightarrow H_2$$

could be carried out with good efficiency with UV photons at high band gap semiconductors. These reactions could also be carried out utilizing visible light at moderate band gap semiconductors.

Photoelectrolysis of water at high efficiency is hampered by a number of problems. First, the overvoltages of the hydrogen and oxygen couples at most moderate band gap ($1.0 < E_g < 2.0$ eV) semiconductors are substantial. Second, if electron or hole transfer to the substrate does not occur rapidly, recombination of electron-hole pairs can occur at surface defects or grain boundaries in polycrystalline samples. Finally, corrosion by products (especially $O_2$ or $H_2O_2$) can result in lower effective rates of product formation. Photocorrosion has also been found to be an important competitive reaction with many common semiconductors such as GaAs, CdS, n-$MoS_2$ and Si.

When a semiconductor is placed in an electrolyte, potential differences between the two phases result in charging of the interface, as in a capacitor. This charging results in a perturbation of the energy levels of the semiconductor called "band-bending". Band-bending is responsible for separation of electron-hole pairs in photoelectrochemical processes. Recombination and corrosion processes decrease the utilization of the electron-hole pairs generated on illumination. Modification of electrode surfaces can be used to enhance rates of photoelectrochemical reactions and suppress photocorrosion and recombination. Many catalysts are known which allow reactions to proceed at zero overpotential (e.g., $2H^+ \rightarrow H_2$ on Pd), and if such catalysts can be coupled to the semiconductor-electrolyte interface, desirable reactions could be run at lower, or zero, external bias. Using reasonable estimates for other losses, photoelectrolysis of water might be expected to run at zero bias with efficiencies close to 20% if the best catalysts for $H_2$ and $O_2$ synthesis could be coupled to cathode and anode, respectively.

Electron mediators such as N,N'-dimethyl 4,4'-bipyridinium (methyl viologen, $MV^{+2}$) have recently found extensive use in promoting electron transport between electrodes and substrates as diverse as $H^+$ at metallized particles, or proteins such as hydrogenases and cytochromes. electron mediators may be used to couple an electrode and a catalyst, thus allowing each one to be selected to perform its function.

$MV^{+2}$ has been shown to be an efficient electron transfer catalyst for $H_2$ evolution. The role of the $MV^{+2}/MV^{+1}$ system is to provide an oxidized material which is efficiently photoreduced and a reduction product which can efficiently transfer electrons to water or hydrogen ions at platinum catalysts to produce $H_2$,

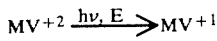  (1)

p-type semiconductor

  (2)

Bard has demonstrated the feasibility of this system with a p-GaAs electrode immersed in a methyl viologen solution with dispersed platinized PtO$_2$. Wrighton has obtained similar results with p-Si. The problems with mediation via solutions of methyl viologen is the intense absorption of visible light by the MV$^{+1}$ species, and the relatively low concentration of the mediator.

SUMMARY OF INVENTION

An improved system of coupling the semiconductor-electrolyte interface has been discovered in accordance with the present invention. The charge mediation system of the invention provides very low absorption of incident light at low concentration of mediator and yet provides significant efficiencies at lower applied potentials.

In the system of this invention the photoelectrode surface is modified by an adherent coating of a charge mediating polymer. A catalyst for the reaction of interest may be dispersed in the polymer film. The polymer film is preferably transparent so that incident light can reach the photoelectrode surface, though light can also be applied to the backside of the semi-conductor electrode. The polymers contain an electroactive unit, preferably a mediation agent such as bipyridinium. The polymers must be stable in contact with the electrolyte and inert to the electrode, catalyst and to all species generated during the electrochemical reaction occurring in the cell.

When the mediator is a repeating unit of a polymer film on the surface of the electrode, electron transport between the electrode and the mediator can become very favorable due to the high concentration of the latter, and competition from photocorrosion and recombination processes will be suppressed. A catalyst may also be incorporated into the film on the electrode surface, providing a reduction in overvoltages of the desired reactions. Corrosion by-products of the reaction may also be inhibited by use of appropriate catalysts. Ideally, the electroactive units in the mediating film should form a highly reversible, outersphere redox couple with an appropriate potential so that electron transport from the semiconductor within the polymer film, and from electroactive units to the substrate, are all rapid processes.

The electroactive polymers can transport charge quite effectively at potentials within several tenths of a volt of the standard potential of electroactive units in the polymer. The polymer film accepts or donates electrons to the semiconductor surface, therefore transporting electrons through the film. The electroactive units in the polymer give up or accept electrons at the substrate-catalyst complex boundary within the composite polymer film. Catalytic reduction of the substrate occurs at the polymer bound catalyst without the need to disperse catalyst in the electrolyte. This further increases the efficiency of the photoelectric conversion by removing a turbid agent (dispersed catalyst) from the electrolyte and further simplifies operation of the cell since there is no need to disperse the catalyst.

The polymer film is readily deposited on the electrode surface. Catalyst can be predispersed in the bulk polymer or solution of polymer before application to the electrode. The catalyst can be formed in situ in the film coated electrode by diffusing a salt of the catalyst into the film and reducing the salt within the polymer matrix to form a uniform dispersion of fine, particles of catalyst.

These and many other features and attendant advantages of the invention will become apparent as the invention becomes better understood by reference to the following detailed description when considered in conjunction with the following drawings.

DETAILED DESCRIPTION OF INVENTION

Figure 1:
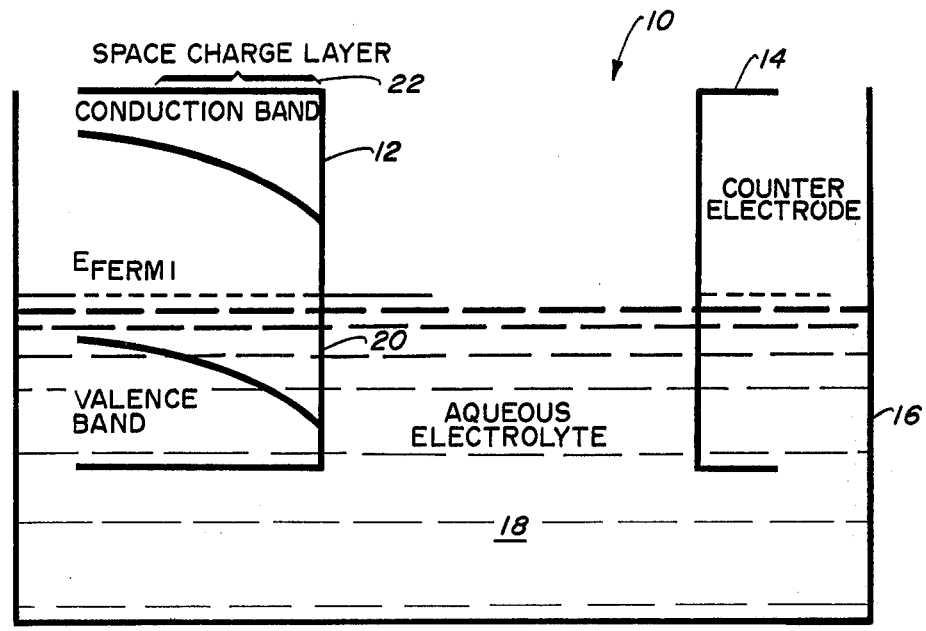
FIG. 1 is a schematic view of a photoelectrolytic cell demonstrating band bending at a p-type semiconductor-electrode interface.

Referring now to FIG. 1, a typical photoelectrochemical cell 10 comprises a p-type semiconductor electrode 12, and a counter-electrode 14 disposed in a container 16 filled with aqueous electrolyte 18. FIG. 1 also shows a typical junction at the surface 20 between the p-type semiconductor electrode 12 and the electrolyte 18. Because there is an acceptor level slightly above the top of the valence band, the Fermi level of the semiconductor is low—typically lower than the electrochemical potential of the electrolyte. This results in a net flow of electrons from the electrolyte 18 to a "space charge layer" 22 (10$^2$–10$^3$ Å thick) in the semiconductor and accumulation of positive charges (cations) in the electrolyte at the semiconductor surface 20. Because of this net flow of charge, and positive charge at the electrode surface in the electrolyte, the energy levels of electrons in the semiconductor near the surface are lowered. This effect is known as "band-bending," and is the principal reason that photoelectrochemical processes may occur with high efficiencies. In an n-type semiconductor, the Fermi level is typically high (near the donor level just below the bottom of the conduction band), the bands bend up, and excess holes are present in the space charge layer and a negatively charged layer occurs in the electrolyte at the interface. Thus, for electrolytes with moderate electrochemical potentials the usual condition is "reverse biased" and, upon illumination, when electron-hole pairs are formed, the majority carriers move into the semiconductor bulk, and minority carriers move to the semiconductor-electrolyte interface. The minority carriers may then be transferred to redox species in the electrolyte. It is worth noting that while there are similarities between a semiconductor-electrolyte interface and a p-n junction, there are differences which favor the semiconductor-electrolyte interface for efficient utilization of visible light energy. The most important difference is the high charge density in the electrolyte at the interface, which can result in higher fields at the interface and very low rates of electron-hole pair recombination.

The losses which limit efficiency of a photoelectrolysis cell estimated for semiconductor of 1.5 eV band gap are solar mismatch (49%), band bending (3%), overpotential (5%), ohmic losses (5%) and recombination (5%). "Solar spectrum mismatch" losses include all photons of $E < E_G$ as well as the excess energy, $E-E_G$ of all higher energy photons. "Overpotential" is the minimum excess potential, over the thermodynamic potential of an electrochemical reaction, needed to make the reaction proceed at a finite rate. "Band bending" and "resistance" losses in the cell can be made arbitrarily close to zero. Recombination losses less than 5% have been demonstrated in p-GaAs and should obtain in other semiconductors with appropriate doping levels and band bending.

Figure 2:
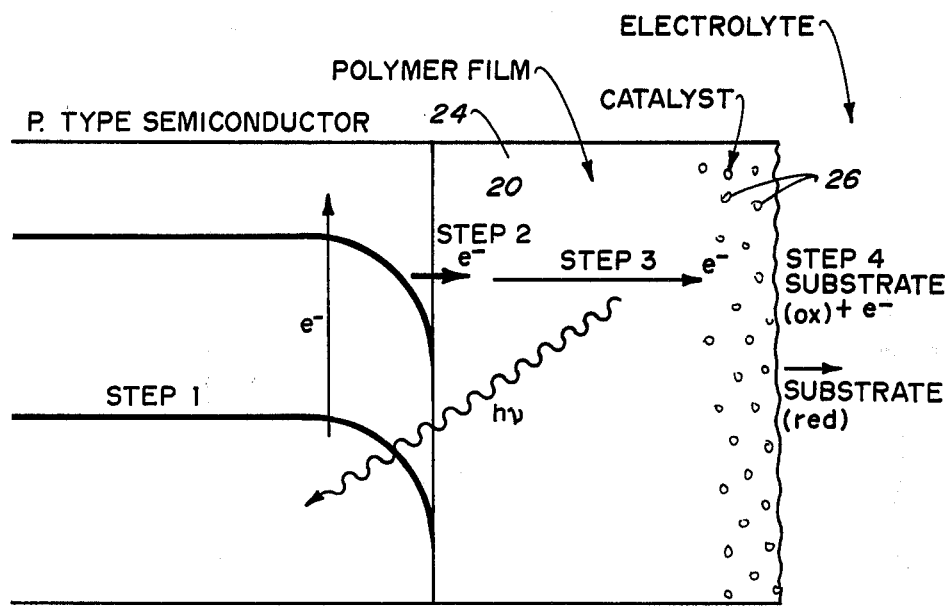
FIG. 2 is a schematic view of a photoelectrochemical cell containing a polymer modified cathode and showing the four photochemical processes occurring in the cell.

Modification of the semiconductor surface 20 as shown in FIG. 2 with a film 24 of polymer minimizes losses due to overpotential and recombination, and also eliminates corrosion processes which reduce efficiency and ultimately lead to complete degradation of the semiconductor. When a high density of electron donors or acceptors are incorporated into the polymer film 24 on the semiconductor surface 20, electron transport across the interface will be a very favorable process and competition from photo-corrosion and recombination will be alleviated. If particles 26 of catalyst are incorporated into the film 24, electron transport between this polymeric "mediator" and the reactant is also facilitated and the net reaction can be performed at low overpotential. Corrosion byproducts or intermediates such as $H_2O_2$ may be inhibited by catalysts which bypass the intermediate or catalyze its conversion to the desired product. Ideally, the electroactive units in the mediating film should be a highly reversible, outer-sphere redox couple with an appropriate potential so that electron transport across the interface, within the film, and from the electroactive units in the film to the substrate are all rapid processes. The film should also be freely permeable to, and not degraded by prolonged exposure to electrolyte, reactants, and products. FIG. 2 shows a schematic of the modified electrode and the important processes which must be considered.

Some moderate band gap semiconductors useful as photoanodes such as gallium arsenide, gallium phosphide, silicon and cadmium sulfide suffer serious photocorrosion. Illumination results in bond-breaking and dissolution of the semiconductor in a system in which oxygen ($O_2$) is synthesized. Other semiconductors, especially the layered, transition metal dichalcogenides such as n-type molybdenum disulfide ($MoS_2$) and molybdenum diselenide ($MoSe_2$) are less seriously photocorroded but suffer attack at crystal defects. Modification of the dichalcogenides will also help eliminate corrosion as well as lowering overpotential and recombination losses.

The thickness of the semiconductor electrode is not critical. However, if the polymer layer is opaque or transmits incident solar radiation inefficiently, the electrode-polymer assembly should be irradiated from the back side. In that configuration, the semiconductor layer should be thin, on the order of 0.1 to 10.0 microns.

The polymer film must adhere well to the semiconductor surface, be electron permeable, charge carrying, and stable to the electrolyte and to any chemical species generated during the electrochemical reaction. The film is also preferably transparent so that the electrode can be inactivated through the front surface. The film is thin, from 100 Angstroms to 10.0 microns, preferably from 500 Angstroms to 5,000 Angstroms in thickness. The film may also contain a dispersion of fine particles of metal catalyst, preferably a hydrogen producing or promoting catalyst, suitably a noble metal such as platinum or palladium. The catalyst is present in the film in an amount such that it is not rate limiting in the hydrogen synthesis. The catalyst is present in the film in an amount of 1 to 50% by weight, preferably from 5 to 10% by weight of the film.

Counter-electrode 14 may also comprise a semiconductor having a coating of the abovesaid polymer film.

Polycationic polymers such as polyquaternary ionenes are conductive and stable in electrolyte. The most preferred polymers according to this invention are ionene polymers containing bipyridyl cations (BPY) which are found to exhibit rapid electron exchange within the film. Films are hydrophilic and highly permeable to electrolyte. The polymers may be linear or cross-linked. Linear polymers have molecular weights from $10^3$ to $10^6$ generally from $10^4$ to $10^5$.

The ionene-bipyridyl polymers are prepared by reaction of a bipyridyl monomer preferably 4,4'-bipyridyl of the formula:

I in solution in a high dielectric constant, polar solvent such as dimethyl sulfoxide (DMSO), dimethyl formamide (DMF), acetonitrile, methanol or mixtures thereof at temperatures from about 20° C. to 60° C., with an equimolar amount of an organic dihalide of the formula:

X-R-X   II where X is halogen, preferably bromo or iodo, and R is a divalent organic group, to form by quaternization a polymer containing quaternary groups within the polymer chain of the formula:

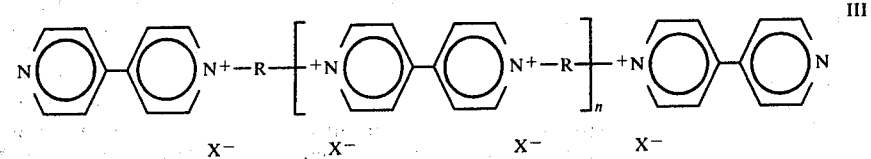
III where n is an integer from 10 to 1,000, preferably 50 to 250.

The film can be formed in the presence of the substrate or the preformed polymer can be cast, coated or laminated to the surface. The catalyst particles can be predispersed in the film or formed in situ. A preferred procedure is to impregnate an ionene film deposited on the electrode surface with a salt in which the anion contains the catalyst, such as a chloroplatinate, followed by reduction. The anions will associate with the quaternary groups and on reduction will form a very uniform dispersion of fine, black platinum particles.

The divalent organic group, —R— can be selected from diverse aliphatic or aromatic groups such as:

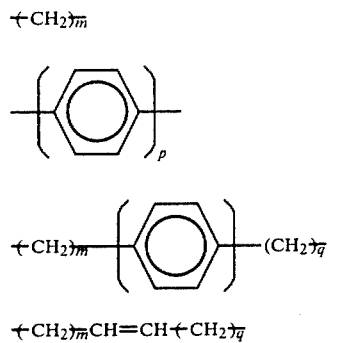

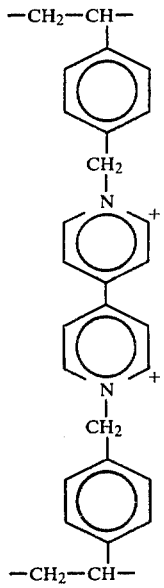
IV

In order to maintain high conductivity and hydrophilicity, the spacing of the quaternary should be at a minimum. Therefore m is an integer from 1 to 20, preferably 2 to 12, p is an integer from 1 to 3 and q is an integer from 1 to 5. The preferred dihalo comonomer is dibromo-xylene. The methyl groups can be in ortho, meta or para position, preferably the latter.

Polymers containing alkenylene groups can be cross-linked by heat, free radical catalysts or by radiation. A very stable cross-linked film is formed by reacting 4,4'-bipyridyl with a haloalkyl styrene such as chloromethyl styrene to form an adduct of the formula:

The nucleophilic substitution activates the vinyl groups which readily cross-link after about a day, apparently due to absorption of light, to form a cross-linked polymer containing the following structure.

Polymer IV can also be prepared by reacting 4,4'-bipyridyl with a polychloromethyl styrene polymer.

The divalent R group can be formed of mixtures of different moieties such as $R^1$ and $R^2$ as illustrated below:

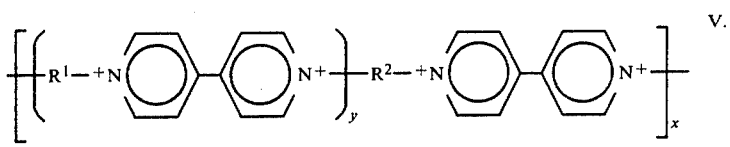
V.

where $R^1$ and $R^2$ are separately selected from the divalent groups defined above. A particular series of ionene polymers were prepared in which $R^1$ is alkylene of 2 to 12 carbon atoms and $R^2$ is alkenylene of 4 to 8 carbon atoms. These ternary polymers permit control of spacing and cross-linking. These polymers are cross-linkable by irradiation or by application of heat.

A series of ionene polymers were prepared by reaction of 4,4'-bipyridyl with organic dihalides in DMSO or DMF. In general, dihalides and 4,4'-bipyridyl in equimolar ratios were dissolved in a minimum of DMSO or DMF under $N_2$ and agitated vigorously at room temperature for several days. When substantial quantities of polymeric product had precipitated, enough water was added to completely dissolve the products and shaking continued for 5-10 days. The polymeric products were then precipitated with acetone, redissolved in water and fractionally precipitated with acetone to obtain samples of different average molecular weight. The polymers were characterized by elemental analysis, infrared spectroscopy, and viscosity measurements in water. Most polymers (~16% w/w) were quite soluble in water as the halide salts, and only slightly soluble in polar organic solvents. The color of the polymer was orange in the iodides, deep yellow in the bromides, and nearly white in the chlorides. The polymers were precipitated from water by addition of salts of larger anions including perchlorate, hexachloroplatinate (IV), and anionic polyelectrolytes such as polystyrenesulfonate. Stability of polymer films on electrodes was studied using cyclic voltammetry, potential step voltammetry, and coulometric techniques. Experiments follow:

EXAMPLE 1

An ionene polymer was prepared by reaction of equimolar amounts of 4,4'-bipyridyl and $\alpha,\alpha'$-dibromo-p-xylene as saturated solutions in N,N-dimethylformamide (DMF) or dimethylsulfoxide (DMSO) under $N_2$ with agitation for several days at room temperature. After large amounts of yellowish polymer had precipitated, distilled water was added to dissolve it and shaking was continued for several additional days. Crude polymer was precipitated by addition of acetone, and was purified by dissolving in water and precipitating with acetone repetitively.

EXAMPLE 2

A series of ionene polymers were prepared according to the procedure of Example 1 except that equivalent amounts of iodo-propane, iodo-hexane, iodo-dodecane, iodo-butane or a mixture of dibromobutene and diiodopropane or diiodoethane were substituted for dibromo-p-xylene.

EXAMPLE 3

Cross-linked 4,4'-bipyridinium polymer was prepared by reaction of 4,4'-bipyridyl with chloromethylstyrene in a molar ratio of 0.50 or by reaction of 4,4'-bipyridyl with polychloromethylstyrene. The former reaction was most suitable for coating electrodes, since styrene polymerization occurred readily under illumination following nucleophilic substitution when the reactants were mixed in DMF solution on the electrode surface. Stable cross-linked films were obtained after curing for 12-24 hours under illumination.

EXAMPLE 4

Platinum was deposited in the films by diffusing hexachloroplatinic acid into the film and then holding the electrode at a reducing potential for several minutes. The electrode appearance then changed from light yellow to grayish if the film was sufficiently thick to be visible. Films ranging from several micrograms to over one milligram per square centimeter were used.

Analogous polymers were prepared by similar methods using a wide variety of organic dihalides. The polymers were characterized by elemental analysis, infrared spectroscopy, and viscosity measurements in water and 0.4 M KBr solutions. These measurements confirmed the composition of the products, absence of starting materials, and viscosity behavior typical of polyelectrolyte solutions. Most polymers were quite soluble in water (16% w/w) as the halide salts, and only slightly soluble in polar organic solvents. The polymers were precipitated from water by addition of salts of larger anions including perchlorate, hexachloroplatinate (IV), and anionic polyelectrolytes such as polystyrenesulfonate.

Films of all polymers were prepared by evaporation of precisely measured quantities of solutions of polymers or reactants on the electrode surface. The stability and electroactivity of polymer films on pyrolytic graphite electrodes was studied using cyclic voltammetry, potential step voltammetry, and coulometric techniques. Most electrodes modified with linear polymers showed an initial loss of part of the electroactive material during cycling over a period of a few hours, thereafter with no subsequent significant loss of material over periods up to one month, in solutions of 0.1 M aqueous sodium perchlorate. However, continuous cycling through the first reduction wave of the polymer for periods of hours resulted in growth of very narrow ($\sim 20$ mV) voltammetric waves at the expense of the rather broad waves initially observed. The narrow waves occurred at slightly more positive potentials and did not appear to affect the overall reversibility of the $BPY^{2+}/BPY^+$ couple. When the polymer was absorbed onto the electrode by reduction of a solution of a halide salt, at $-0.4$ V versus standard calomel electrode (SCE), the waves observed for the absorbed polymer were also quite narrow, implying a polymer coating morphology which favors the reduced form of the electroactive unit, and exhibits cooperative effects during electrochemical processes.

Electrochemical experiments were carried out using a Wenking Model 68FRO.5 potentiostat, an EG+G PAR Model 379 digital coulometer, and a Hewlett Packard Model 3310A function generator; or an EG+G PAR Model 174 polarographic analyzer. Cells used for photoelectrochemical experiments were three compartment cells with an optical quality fused quartz flat incorporated into the working electrode compartment. A cell used for collection of $H_2$ gas could be sealed and degassed on a vacuum line, and the collected gas could be removed and measured through a serum cap using a gas syringe.

The radiant flux of the 1000 watt xenon lamp (Oriel Corp.) used for these studies was measured with the use of an actinometer consisting of o-nitrobenzylaldehyde, which responds to 250-450 nm radiation, imbedded in films of polymethylmethacrylate. The flux of the lamp in the range of 450-700 nm was estimated from the published spectral energy distributions of xenon lamps, and the known flux of our lamp in the 250-450 nm region. The total flux at a distance of 40 cm from the focal point of the lamp was calculated to be $8.5 \times 10^{16}$ photons/(cm$^2$sec) for the wavelength region 250-700 nm. Photoelectrochemical responses of modified and unmodified electrodes were obtained by voltammetry in the dark, under illumination and under chopped light at distances of 35-45 cm from the focal point.

The polymer of Example 1 was absorbed on natural p-type $MoS_2$ crystals (largely 001 faces). Cleavage fragments of natural crystals were abraded until each was uniformly thin. Copper wire leads were attached using indium-zinc soldier which covered the back of the crystals. The leads, backs of the crystals, and crystal edges were then encased in epoxy. Photoelectrochemical inventigations were then carried out in aqueous solutions containing sodium perchlorate, with 0.1 M sodium hydroxide, perchloric acid or phosphate buffer to vary the pH between 1 and 11. Electrodes were coated using water-methanol solutions of the polymers of Examples 1 and 3 and the polymer treated with $H_2PtCl_6$. Cyclic voltammograms of an electrode coated with the polymer, at pH 11, and in the dark, revealed two one-electron reductions at potentials of $-0.43$ and $-1.03$ V vs. SCE.

Static photocurrents from p-$MoS_2$ modified with the polymers of Examples 1 or 3 containing platinum were obtained by first holding the electrode at a fairly negative potential ($-0.7$ or $-0.8$ V vs. SCE) until at least ten times the charge necessary to reduce all electroactive species in the film had been passed and a static response was obtained. Thereafter, the potential was moved positive in steps of 50 or 100 mV and allowed to equilibrate for 5-40 minutes at each potential to obtain a steady current. The same $MoS_2$ electrode was used for measurements from $-0.8$ to $+0.4$ V vs. SCE at pH 1.5, 2.1, 4.2, 5.7, and 6.7; and the response after all these experiments was slightly better than the initial response. Other modified p-$MoS_2$ specimens shows fairly similar behavior, usually with slightly lower photocurrents due to high $MoS_2$ sample resistance.

Hydrogen gas was collected by displacing electrolyte and removed with a gas syringe. Analysis of the gas was performed on a Hewlett-Packard 5880 gas chromatograph equipped with a 6 foot column packed with 13 x molecular sieves (100-120 mesh) and a thermal conductivity meter. For a typical experiment, 1.001 Coulombs was passed at a bias voltage of $-0.45$ V vs. SCE at pH 2.5, and 10 ul of gas was collected, of which 78% was $H_2$. This experiment was carried out at a potential negative of the thermodynamic potential for $H_2$ evolution in the dark at this electrode. The measured faradaic efficiency was 69%. Since it was not possible to collect the hydrogen quantitatively, and negligible steady-state current was observed in the dark or in the absence of platinum, it is reasonable to suspect that the actual faradaic efficiency is close to 100%.

Figure 3:
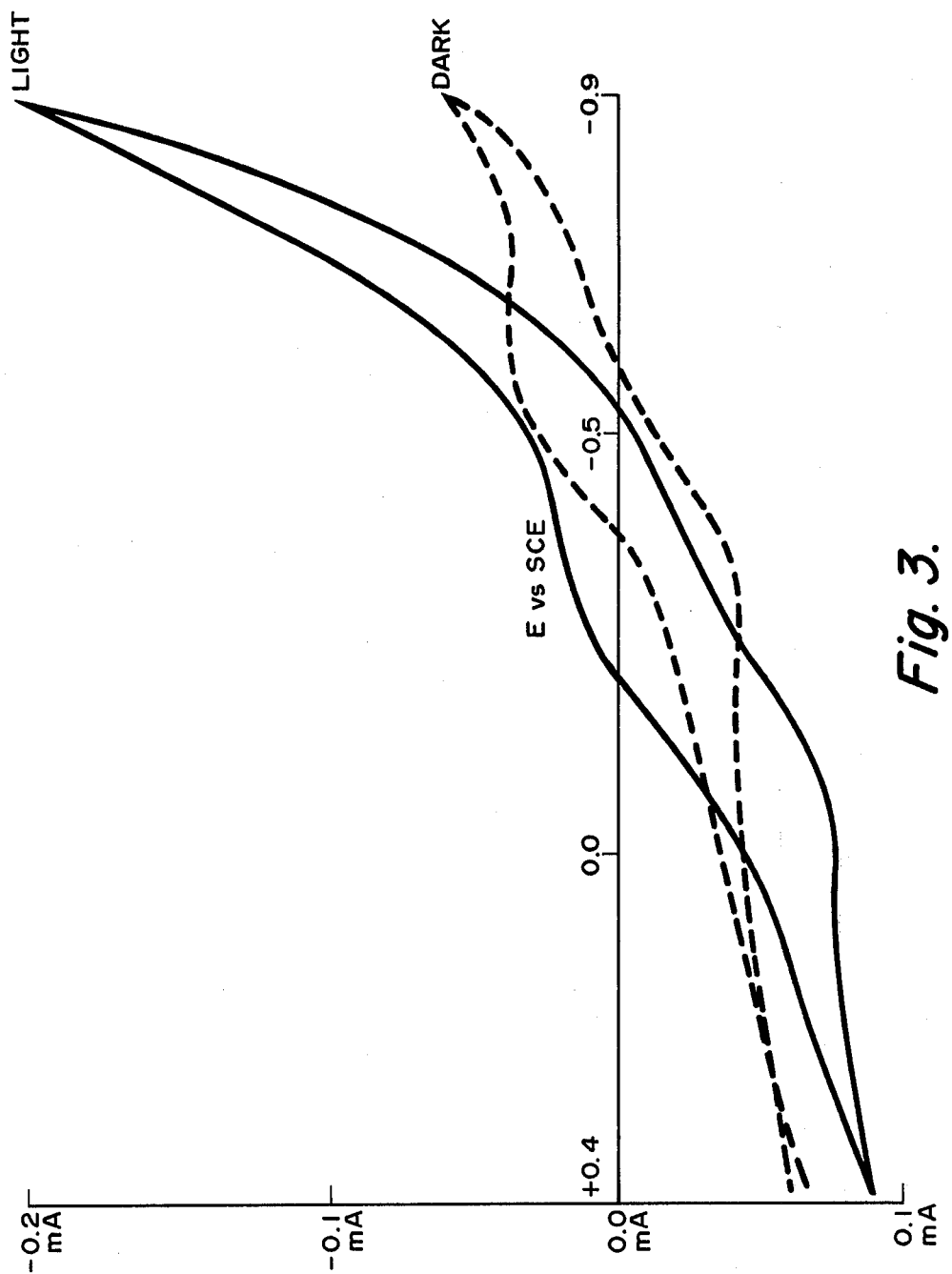
FIG. 3 is a series of cyclic voltammograms (scan rate 13 mV/sec) in the dark and under illumination.

Cyclic voltammograms of polymers of Examples 1, 2 and 3 on pyrolytic graphite showed waves characteristic of the $BPY^{2+}/BPY^+$ couple. The peak widths and separations are somewhat greater than expected for a reversible coupled as is typical of thicker polymer films where hundreds or thousands of monolayers are electrochemically active. As many as 50% of the bipyridinium groups could be readily reduced in films as thick as 100 mg/$cm^2$. The waves observed in cyclic voltammograms on p-$MoS_2$ are somewhat broader than on graphite, perhaps due to non-uniform crystal morphology and resistance. FIG. 3 shows cyclic voltammograms of 0.1 mg films of the polymer of Example 1 coated on a 0.16 $cm^2$ p-$MoS_2$ electrode in the dark and under illumination. The scan rate was 13 mV/sec, the aqueous electrolyte was pH 6.7, 0.2 Molar ammonium phosphate buffer containing 0.1 Molar sodium perchlorate. The magnitude of the peak shift under illumination (up to 380 mV) varies considerably with the sample and electrolyte, since the potential of the $BPY^{2+}/BPY^+$ couple lies very near the bottom of the conduction band of $MoS_2$.

Figure 4:
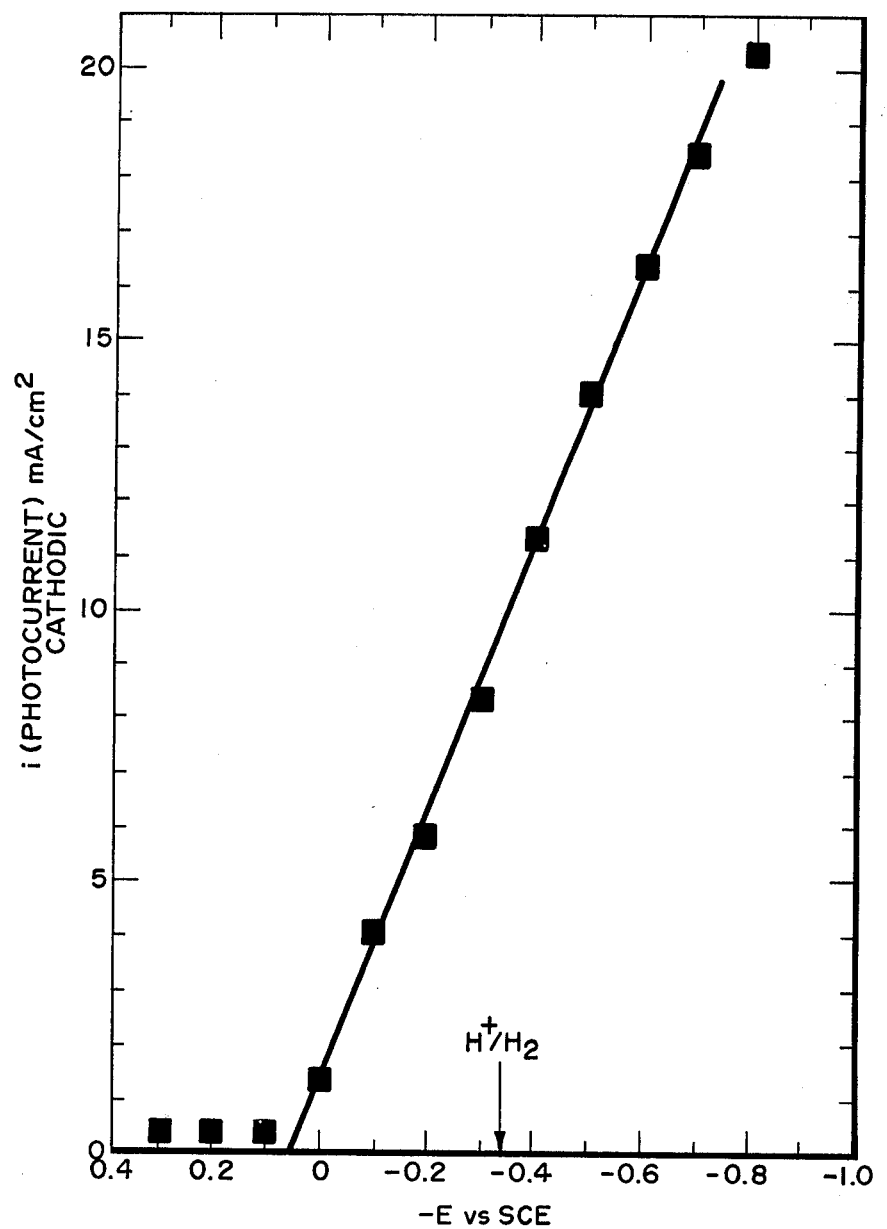
FIG. 4 is a graph of the steady-state photocurrent at a p-MoS$_2$ electrode modified with ionene polymer and platinum catalysts.
Figure 5:
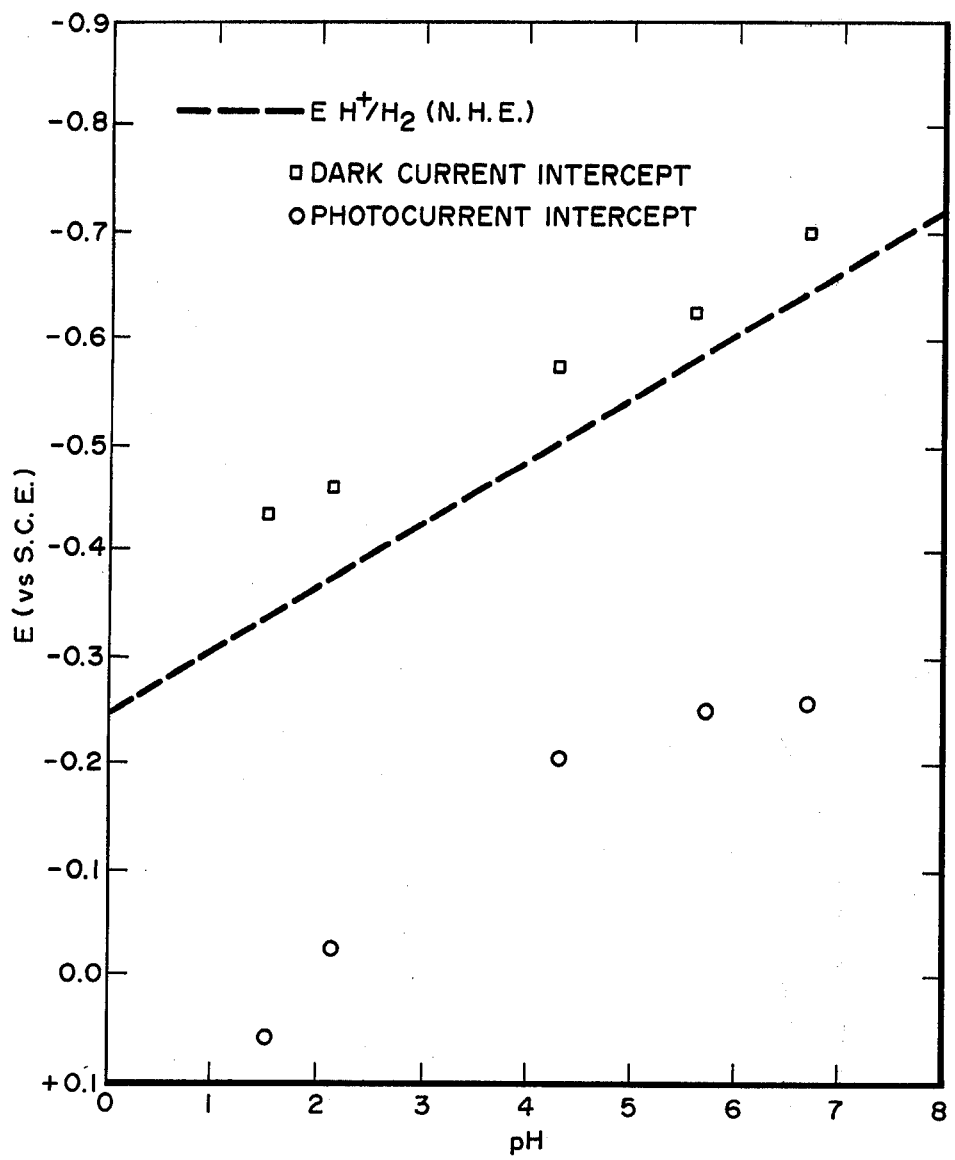
FIG. 5 is a graph showing onset potentials for the photocurrent and dark current for modified p-MoS$_2$ electrode (of FIG. 3), determined by extrapolating the linear, rising photocurrent back to i=O, as a function of pH.

If enough platinum is deposited in the film so that the amount of platinum is not the rate limiting step in hydrogen synthesis (i.e. greater than $\sim$5-10% Pt by weight), electron transport within the film appears to be a rate limiting step. The steady state photocurrent shows a linear, ohmic dependence on potential at potentials negative of an onset value, as shown in FIG. 4, which displays the steady state photocurrent of a p-$MoS_2$ electrode modified with the polymer of Example 3 and platinum as in Example 4. The solution was 0.2 M phosphoric acid. The dark current, which was negligible, has been subtracted. With a Pt/polymer ratio of $\sim$0.1 the efficiency of the photoelectrochemical hydrogen synthesis increased with the quantity of the film up to $\sim$2 mg/$cm^2$. Similar slopes were shown for dark currents on $MoS_2$ and on graphite, indicating film resistivities of $\sim 10^5$-$10^6$ ohm-cm associated with electron transport. The slopes were also identical within experimental error for one 0.12 $cm^2$ $MoS_2$ electrode at pH 1.5, 2.1, 4.2, 5.7, and 6.7, modified with a polymer formed in situ from a DMF solution of 0.1 mg of 4,4'-bipyridyl and 0.2 mg of chloromethyl styrene which contains 0.07 mg of $H_2PtCl$ 6. The extrapolated onset potentials under illumination and in the dark for this electrode are shown in FIG. 5. The dependence of the onset potential on pH can be explained by the electrochemical potential of the polymer/electrolyte at the interface. At low pH, because $E(H^+/H_2) < E°(BPY^{2'}/BPY^+)$, the concentration of $BPY^+$ always remains low and $E_{Fermi}$ ($MoS_2$) $= E(H^+/H_2)$ and shows strong pH dependence.

When pH $>$ 5, both $BPY^{2+}$ and $BPY^+$ are present within the film in high concentrations. Therefore $E_{Fermi}$ ($MoS_2$) $= E°(BPY^{2+}/BPY^+)$ and $H_2$ is formed by uphill electron transport from $BPY^+$ because $H_2$ is rapidly removed from the surface. The net process of electron transport from the $MoS_2$ conduction band edge of $H^+$ is still downhill. When the pH becomes very high, electron transport from $BPY^+$ to $H^+$ will probably be greatly hindered. Unfortunately, the polymers are hydrolyzed at pH $>$ 7.0 and static currents cannot be obtained in basic solutions.

The efficiency of energy conversion was maximum at pH 1.5, where a stable photocurrent of 4.1 mA.$cm^2$ was observed at a potential 0.24 V positive of $E(H^+/H_2)$. The p-$MoS_2$ electrode was coated with 2.5 mg/$cm^2$ of polymer of Example 3 and 0.25 mg/$cm^2$ of polymer of Example 3 and 0.25 mg/$cm^2$ platinum. The calculated value of visible light to chemical energy conversion efficiency for the experiment, run at 42 cm from the lamp focus, was 3.9%.

As FIG. 4 shows, weak static photocurrents ($\sim$0.3 mA/$cm^2$) were observed at potentials significantly positive of the onset potential for the ohmic photocurrent. Weak transient photocurrents were also observed with chopped light experiments in this region for p-$MoS_2$ electrodes coated with the 4,4'-bipyridinium polymers, alone but not for unmodified p-$MoS_2$ electrodes. While a precise interpretation of this effect is difficult, this part of the photocurrent shows little dependence on film thickness and may be due to the presence of surface states due to surface absorbed electroactive units.

Films of the electroactive polymers of Example 1 and 3 were deposited on p-type $MoS_2$ and $MoSe_2$ semiconductor electrodes. These polymers are effective at transporting charge and polymer modified electrodes gave photocurrents at large potential shifts.

Natural p-type $MoS_2$ crystals showed greatly enhanced visible-light-to-chemical-energy conversion efficiency following modification with a film composed of a charge-mediating polymer and catalyst. Onset of dark currents for $H_2$ synthesis indicated that the dark overpotential is reduced to $\sim$100 mV. Photoelectrochemical energy conversion efficiency was increased from 0% to 3.9% by modification of the surface with 2.5 mg/$cm^2$ of polymer of Example 3 and 0.25 mg/$cm^2$ of platinum. Charge transport was found to be a rate limiting step and most of the photocurrent was due to reduction of $H^+$ within the polymer film rather than at its interface either with the semiconductor or with the bulk electrolyte. It is important to recognize that these results pertain to a polymer film freely permeable to the electrolyte. The amount of platinum catalysts was rate limiting when it was less than 5-10% of the weight of the polymer.

The linear bipyridinium polymer gave the largest electrochemical and photoelectrochemical response on p-MoS$_2$, but the cross-linked polymer gave a more stable response because it did not dissolve or undergo morphological changes. The linear polymers can be cross-linked during or after polymerization by means of reaction with tri- or higher functional halides or tertiary amines. Cross-linking is preferably is preferably effected by addition cross-linking of unsaturated groups provided by alkene or other monomers.

Weak photocurrents were observed at photopotentials of up to 700 mV for p-MoS$_2$ electrodes modified with 4,4'-bipyridinium polymers with or without platinum. Enhancement of the rate of charge transport within the polymer films should be a useful approach toward obtaining modified electrodes for photoelectrochemical processes. Polymers with more closely spaced electroactive units would have higher rates of charge transport. Electroactive polymers appear to be very effective in enhancing photoelectrochemical effects at flawed or polycrystalline electrodes which would normally show behavior dominated by recombination of electron hole pairs.

The photoelectrochemical systems of the invention have the potential of performing a wide variety of electrochemical reactions which require significant energy input. The reaction of greatest general utility and interest is photoelectrolysis of water. A specific application is the regeneration of hydrogen and oxygen for fuel cell use. Since the photoelectrolytic system converts light energy directly to chemical energy of products, a photoelectrolytic array would take the place of both a power source such as a photovoltaic array as well as an electrolyzer. Other equipment such as the power conditioner for the electrolyzer and some radiators could also be eliminated.

It has been demonstrated that photoelectrochemical cells of the invention can be used for terrestrial solar energy conversion. This type of process could also be applied in manned space missions as part of a closed environmental life support system (CELSS). In a space mission, CO$_2$ could be photoelectrochemically reduced to a growth substrate (methanol) for single cell organisms as part of a hybrid chemical-biological food production. Photoelectrochemical cells potentially could be applied to fuel production on planetary surfaces where the rain materials are available. The advantages of this process are its high theoretical upper limit of efficiency 25-35%, and fuels can be generated directly.

It is to be understood that only preferred embodiments of the invention have been described and that numerous substitutions, modifications and alterations are permissible without departing from the spirit and scope of the invention as defined in the following claims.

We claim:

1. An electrode for an electrochemical cell comprising:
   a conductive substrate; and
   a film of stable, electrolyte-permeable, charge-mediating, conductive, polymer containing quaternized bipyridyl groups and cross-links between unsaturated groups on different polymer chains deposited on a surface of the substrate.

2. An electrode according to claim 1 in which the film has a thickness from 100 Angstroms to 10 microns.

3. An electrode according to claim 2 in which the thickness of the film is from 500 Angstroms to 5,000 Angstroms.

4. An electrode according to claim 2 in which the electrode further contains an effective amount of a catalyst capable of promoting an electrochemical reaction.

5. An electrode according to claim 4 in which the reaction is the photolysis of water and the catalyst promotes the generation of hydrogen gas.

6. An electrode according to claim 5 in which the catalyst is a dispersion of fine particles of noble metal within the film.

7. An electrode according to claim 6 in which the catalyst is platinum and is present in an amount from 1 to 50% by weight of the film.

8. An electrode according to claim 2 in which the polymer has a molecular weight from $10^3$ to $10^6$.

9. An electrode according to claim 2 in which the polymer is selected from polymers of the formula:

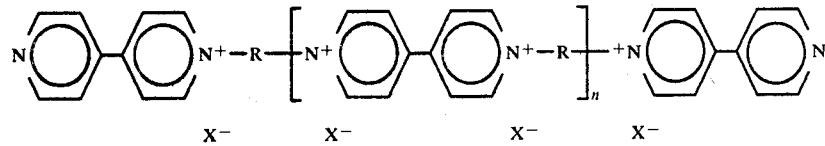

where n is an integer from 10 to 1,000 and R is aliphatic or aromatic groups selected from

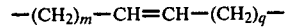

where m is an integer from 1 to 20, p is an integer from 1 to 3 and q is an integer from 1 to 5.

10. An electrode according to claim 9 in which R includes alkylene of 2 to 12 carbon atoms and alkenylene of 4 to 8 carbon atoms.

11. An electrode according to claim 2 in which the polymer is the cross-linked product of the prepolymer of the formula:

12. An electrode according to claim 1 for use in a photoelectrochemical cell in which the substrate is a semi-conductor having a band gap of no more than 2.0 eV.

13. An electrode according to claim 12 in which the semiconductor has a band gap from 1.0 eV to 2.0 eV.

14. An electrode according to claim 13 in which the semiconductor is selected from silicon and compounds of gallium, molybdenum or tungsten.

15. An electrode according to claim 14 in which the compounds are selected from gallium arsenide, gallium phosphide, molybdenum sulfide, molybdenum selenide, tungsten sulfide or tungsten selenide.

16. An electrochemical cell comprising:
an electrode as defined in claim 1;
a counter electrode
a body of electrolyte in communication with both electrodes.

17. A cell according to claim 16 in which the counter-electrode is a semiconductor containing a film of said polymer.

18. A method of forming a modified electrode comprising the step of depositing by in situ polymerization a film of electrolyte permeable, charge-mediating conductive polymer containing quaternized bipyridyl groups and cross-links between unsaturated groups on different polymer chains on the surface of a conductive substrate.

19. A method according to claim 18 further including the step of dispersing catalyst throughout the film.

20. A method according to claim 19 in which the catalyst is formed by impregnating the film with a solution of a reducible precursor salt and reducing the salt.

21. A method according to claim 18 in which the substrate is a plate of semi-conductor having a band gap of no more than 2.0 eV.

22. A modified photoelectrode comprising a solid semi-conductor having a band gap below 2.0 eV coated with a film of polyquaternary, bipyridyl polymer containing cross-links between unsaturated groups on different chains and a dispersion of fine, hydrogen producing catalyst.

23. A method of photolysing water comprising placing an electrode comprising a solid semiconductor having a band gap below 2.0 eV coated with a film of polyquaternary, bipyridyl polymer containing cross-links between unsaturated groups on different chains and a dispersion of fine, hydrogen producing catalyst, and a counterelectrode in aqueous electrolyte;
illuminating the coated electrode with solar energy;
photolysing water to produce hydrogen gas; and
collecting said gas.

* * * * *